United States Patent
Ikuta

(10) Patent No.: US 10,321,670 B2
(45) Date of Patent: Jun. 18, 2019

(54) DUAL-BEARING REEL

(71) Applicant: Shimano Inc., Sakai, Osaka (JP)

(72) Inventor: Takeshi Ikuta, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 252 days.

(21) Appl. No.: 15/337,159

(22) Filed: Oct. 28, 2016

(65) Prior Publication Data

US 2017/0172129 A1 Jun. 22, 2017

(30) Foreign Application Priority Data

Dec. 22, 2015 (JP) ................. 2015-250126

(51) Int. Cl.
*A01K 89/01* (2006.01)
(52) U.S. Cl.
CPC .............................. *A01K 89/01085* (2015.05)
(58) Field of Classification Search
CPC .............. A01K 89/015; A01K 89/0155; A01K 89/0182; A01K 89/0192
See application file for complete search history.

(56) References Cited

U.S. PATENT DOCUMENTS

| | | | | |
|---|---|---|---|---|
| 2,051,259 A | * | 8/1936 | James ............... | A01K 89/01911 242/272 |
| 2,554,411 A | * | 5/1951 | Dell ................... | A01K 89/0155 242/293 |
| 2,600,939 A | * | 6/1952 | Torrence .......... | A01K 89/01556 242/294 |
| 2,706,602 A | * | 4/1955 | Spears ............... | A01K 89/0155 242/287 |
| 2,755,034 A | * | 7/1956 | Eisele ................ | A01K 89/0155 242/294 |
| 2,776,096 A | * | 1/1957 | Isbell ................ | A01K 89/0155 242/272 |
| 3,319,903 A | * | 5/1967 | Mosier ............. | A01K 89/01556 242/287 |
| 3,464,646 A | * | 9/1969 | Odom ............. | A01K 89/019125 242/274 |
| 3,670,985 A | * | 6/1972 | Morishita .......... | A01K 89/0155 242/260 |
| 4,117,990 A | * | 10/1978 | Denny ............... | A01K 89/0155 242/287 |
| 4,570,878 A | * | 2/1986 | Nakajima .......... | A01K 89/0155 242/261 |
| 4,871,126 A | * | 10/1989 | Myojo ............... | A01K 89/0155 242/323 |
| 5,482,220 A | * | 1/1996 | Hashimoto ........ | A01K 89/0192 242/279 |

(Continued)

FOREIGN PATENT DOCUMENTS

JP   2005130707 A   5/2005

*Primary Examiner* — Emmanuel M Marcelo
(74) *Attorney, Agent, or Firm* — United IP Counselors, LLC

(57) ABSTRACT

A dual-bearing reel includes a reel unit, a spool, and a guide member. The reel unit includes a first reel body and a second reel body. The spool is disposed between the first reel body and the second reel body. The guide member is attached to the reel unit and restricts a moving range of a fishing line forwardly released from the spool. Additionally, the guide member overlaps with the first reel body and the second reel body. The guide member makes contact with the first reel body and the second reel body.

14 Claims, 6 Drawing Sheets

(56) References Cited

U.S. PATENT DOCUMENTS

| | | | | |
|---|---|---|---|---|
| 5,489,070 A | * | 2/1996 | Puryear | A01K 89/01916 242/261 |
| 6,109,555 A | * | 8/2000 | Svenson | A01K 89/0155 242/287 |
| 6,283,394 B1 | * | 9/2001 | Ryen | A01K 89/01556 242/287 |
| 2003/0146323 A1 | * | 8/2003 | Jeane | A01K 89/0192 242/310 |
| 2007/0114316 A1 | * | 5/2007 | Klein | A01K 89/0192 242/278 |
| 2009/0194626 A1 | * | 8/2009 | Gray | A01K 89/01931 242/249 |
| 2013/0126652 A1 | * | 5/2013 | Takechi | A01K 89/015 242/283 |
| 2013/0193250 A1 | * | 8/2013 | Ikebukuro | A01K 89/01903 242/261 |
| 2014/0291430 A1 | * | 10/2014 | Takamatsu | A01K 89/006 242/283 |
| 2015/0208631 A1 | * | 7/2015 | Niitsuma | A01K 89/015 242/241 |
| 2015/0245599 A1 | * | 9/2015 | Edwards | A01K 87/04 43/24 |

\* cited by examiner

DUAL-BEARING REEL

CROSS-REFERENCE TO RELATED APPLICATIONS

This application claims priority to Japanese Patent Application No. 2015-250126 filed on Dec. 22, 2015, the entirety of which is hereby incorporated by reference in its entirety.

BACKGROUND

Technical Field

The present disclosure relates to a dual-bearing reel.

Background Information

The dual-bearing reel includes a reel unit, a spool, a handle and a rotation transmission mechanism. The spool is rotatably supported by the reel unit. The handle is rotatably attached to a lateral surface of the reel unit. When the handle is rotated, the spool rotates.

A well-known type of dual-bearing reel is not provided with a level winding mechanism in order to reduce resistance acting on a fishing line in jigging. However, this type of dual-bearing reel without the level winding mechanism has drawbacks as follows. When wind blows while tension acting on the fishing line is reduced by, for instance, tilting down the fishing rod, chances are that the fishing line outwardly moves within the reel unit. In winding the fishing line under this condition, it is inevitable that the winding position of the fishing line unevenly concentrates on one side of the spool. To solve the drawback, a dual-bearing reel described in Japan Laid-open Patent Application Publication No. 2005-130707 includes a guide member for restricting the moving range of the fishing line.

However, the aforementioned dual-bearing reel potentially has a drawback because the fishing line gets stuck in a gap between the guide member and the reel unit.

BRIEF SUMMARY

It is an object of the present disclosure to prevent a fishing line from getting stuck in a gap between a guide member and a reel unit.

A dual-bearing reel according to an aspect of the present disclosure includes a reel unit, a spool and a guide member. The reel unit includes a first reel body and a second reel body. The spool is disposed between the first reel body and the second reel body. The guide member is attached to the reel unit. The guide member restricts a moving range of a fishing line forwardly released from the spool. The guide member overlaps with the first reel body and the second reel body when the dual-bearing reel is seen from a front view. The guide member contacts the first reel body and the second reel body.

According to this construction, the guide member overlaps with the first reel body and the second reel body when the dual-bearing reel is seen from a front view. Additionally, the guide member contacts the first reel body and the second reel body. Therefore, the fishing line can be prevented from getting stuck in a gap between the guide member and the reel unit.

The guide member can have a plate-like shape.

The guide member can include a mount part, a first guide part, a second guide part and a third guide part. The mount part extends in an axial direction and is attached to the reel unit. The first guide part circumferentially extends from a first end of the mount part. The second guide part circumferentially extends from a second end of the mount part. The third guide part extends in the axial direction and couples the first guide part and the second guide part.

The first guide part can contact the first reel body.

The guide member can include a contact part extending from the second guide part toward the second reel body. The contact part can contact the second reel body. According to this construction, even when the second reel body has a smaller outer diameter than the first reel body, the contact part enables the guide member to contact the second reel body.

The second guide part can contact the second reel body.

The first reel body can include an outer peripheral surface having a first recess. The guide member can include a first protrusion. The first protrusion is fitted to the first recess. According to this construction, the fishing line can be more reliably prevented from getting stuck in a gap between the guide member and the first reel body.

The guide member can include a circumferential end having a first protrusion. The guide member can be attached, at the other circumferential end of the guide member, to the reel unit.

The second reel body can include an outer peripheral surface having a second recess on an outer peripheral surface. The guide member can include a second protrusion. The second protrusion is fitted to the second recess. According to this construction, the fishing line can be more reliably prevented from getting stuck in a gap between the guide member and the second reel body.

The guide member can include a circumferential end having a second protrusion. The guide member can be attached, at another circumferential end of the guide member, to the reel body.

Overall, according to the present disclosure, the fishing line can be prevented from getting stuck in the gap between the guide member and the reel unit.

BRIEF DESCRIPTION OF THE DRAWINGS

Referring now to the attached drawings which form a part of this original disclosure.

DETAILED DESCRIPTION OF EMBODIMENTS

A dual-bearing reel according to a preferred embodiment of the present disclosure will be hereinafter explained with reference to the attached drawings. It should be noted that in the following explanation, the term "axial direction" refers to a direction in which a rotational axis O of a spool extends. Additionally, the term "circumferential direction" refers to a circumferential direction along an imaginary circle about the rotational axis O. The term "radial direction" refers to a direction radiating perpendicularly from the rotational axis O. The term "forward" refers to a direction in which a fishing line is released from the dual-bearing reel.

Figure 1:
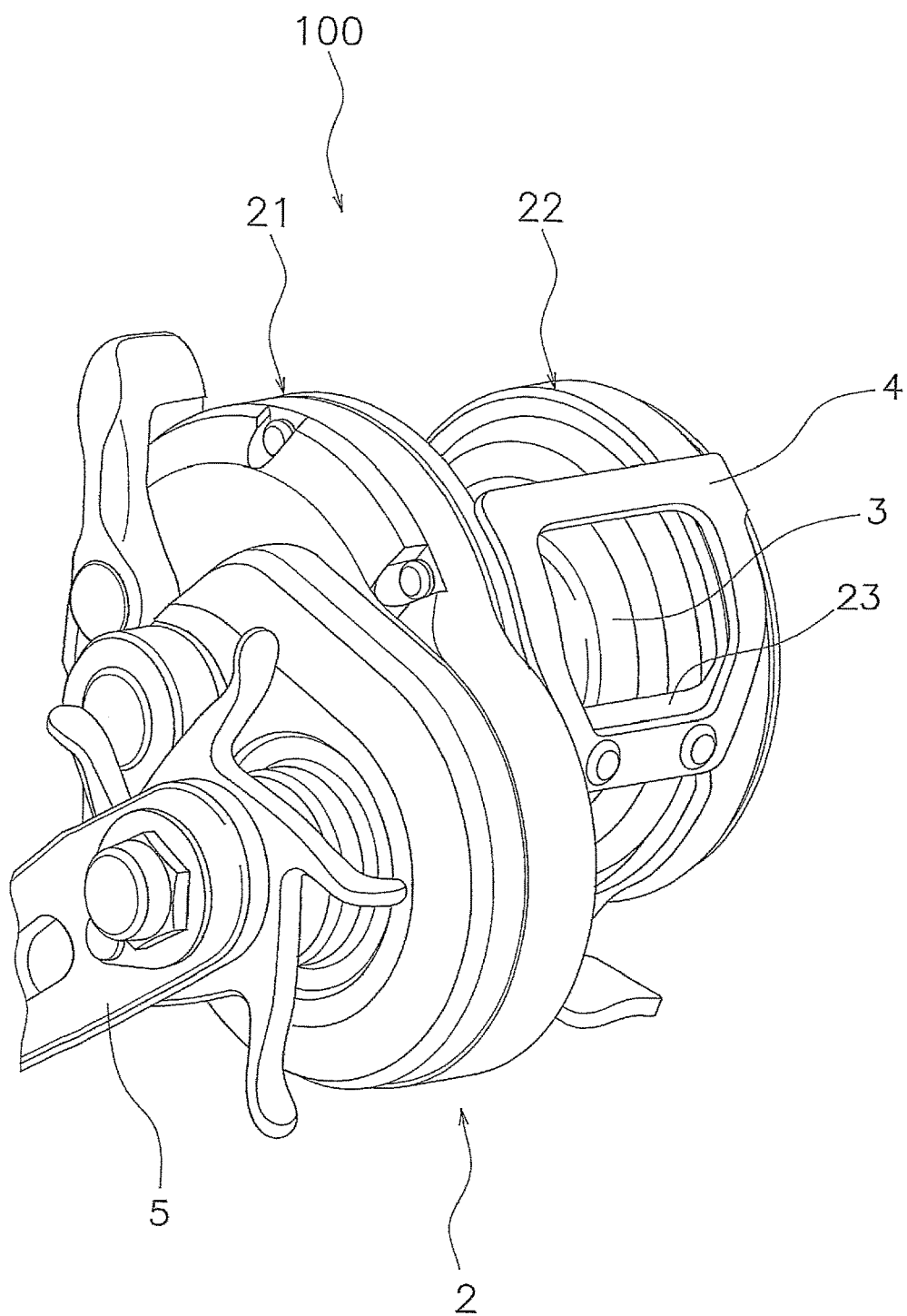
FIG. 1 is a perspective view of a dual-bearing reel.
Figure 2:
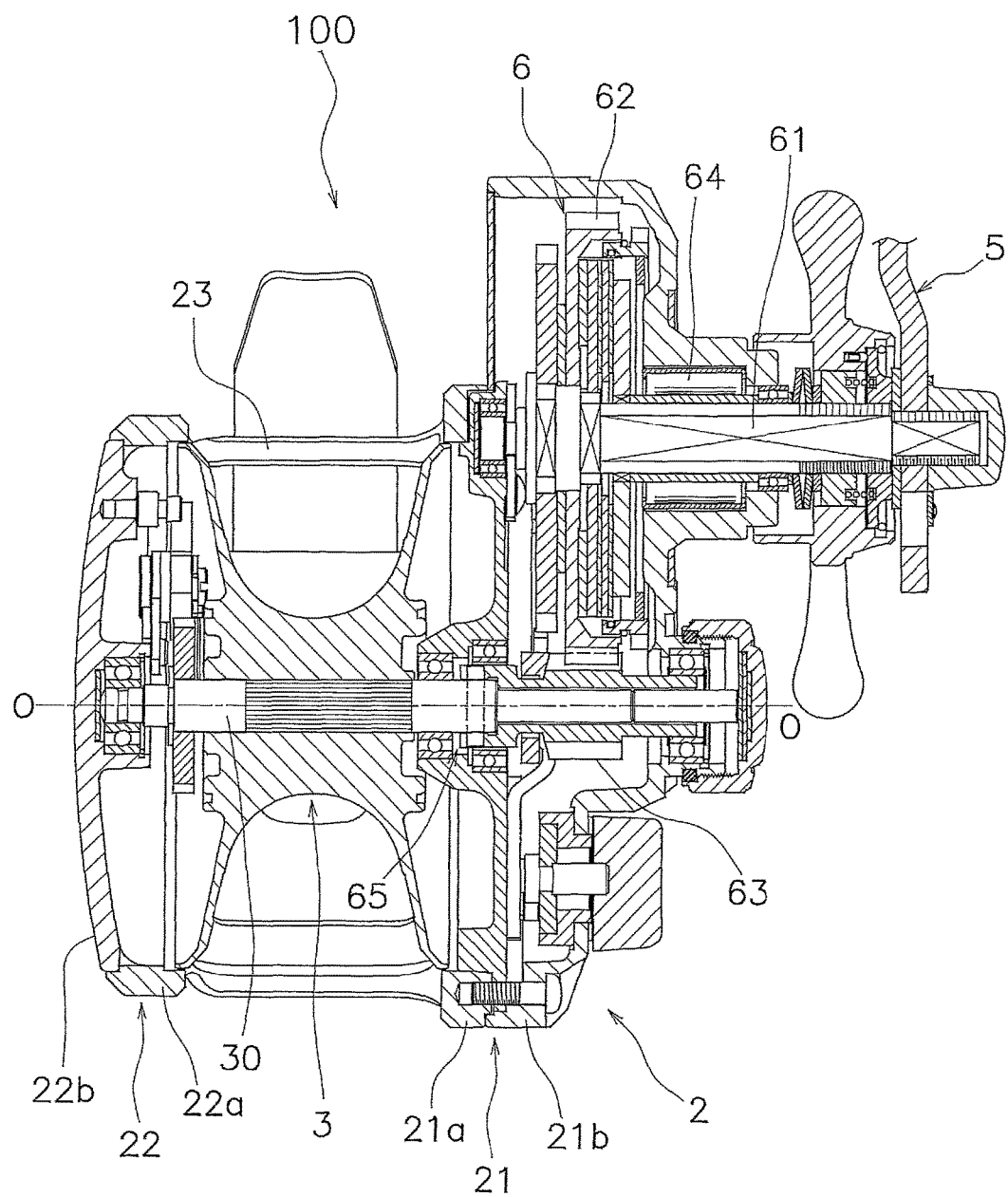
FIG. 2 is a cross-sectional view of the dual-bearing reel.

As shown in FIGS. 1 and 2, a dual-bearing reel 100 includes a reel unit 2, a spool 3, a guide member 4, a handle 5 and a rotation transmission mechanism 6.

As shown in FIG. 2, the reel unit 2 includes a first reel body 21 and a second reel body 22. The first reel body 21 and the second reel body 22 are disposed at an interval apart from each other in the axial direction. When described in detail, the first reel body 21 is disposed on the same side as a first end of the spool 3, whereas the second reel body 22 is disposed on the same side as a second end of the spool 3. The first reel body 21 and the second reel body 22 are coupled to each other through coupling parts 23.

The reel unit 2 includes a first side plate 21*a*, a first cover 21*b*, a second side plate 22*a* and a second cover 22*b*. The first side plate 21*a* and the second side plate 22*a* are coupled to each other through the coupling parts 23. The first side plate 21*a*, the second side plate 22*a* and the coupling parts 23 are integrally formed and compose the frame of the reel unit 2. For example, the first side plate 21*a*, the second side plate 22*a* and the coupling parts 23 can be integrally formed by die-cast molding of aluminum alloy. The first reel body 21 includes the first side plate 21*a* and the first cover 21*b*. On the other hand, the second reel body 22 includes the second side plate 22*a* and the second cover 22*b*.

The spool 3 is rotatably disposed between the first reel body 21 and the second reel body 22. The fishing line is wound onto the outer peripheral surface of the spool 3. The spool 3 is fixed to a spool shaft 30 and rotates unitarily with the spool shaft 30. It should be noted that the spool shaft 30 extends between the first reel body 21 and the second reel body 22. The spool shaft 30 is rotatably supported by the first and second reel bodies 21 and 22 through bearing members and so forth.

Figure 3:
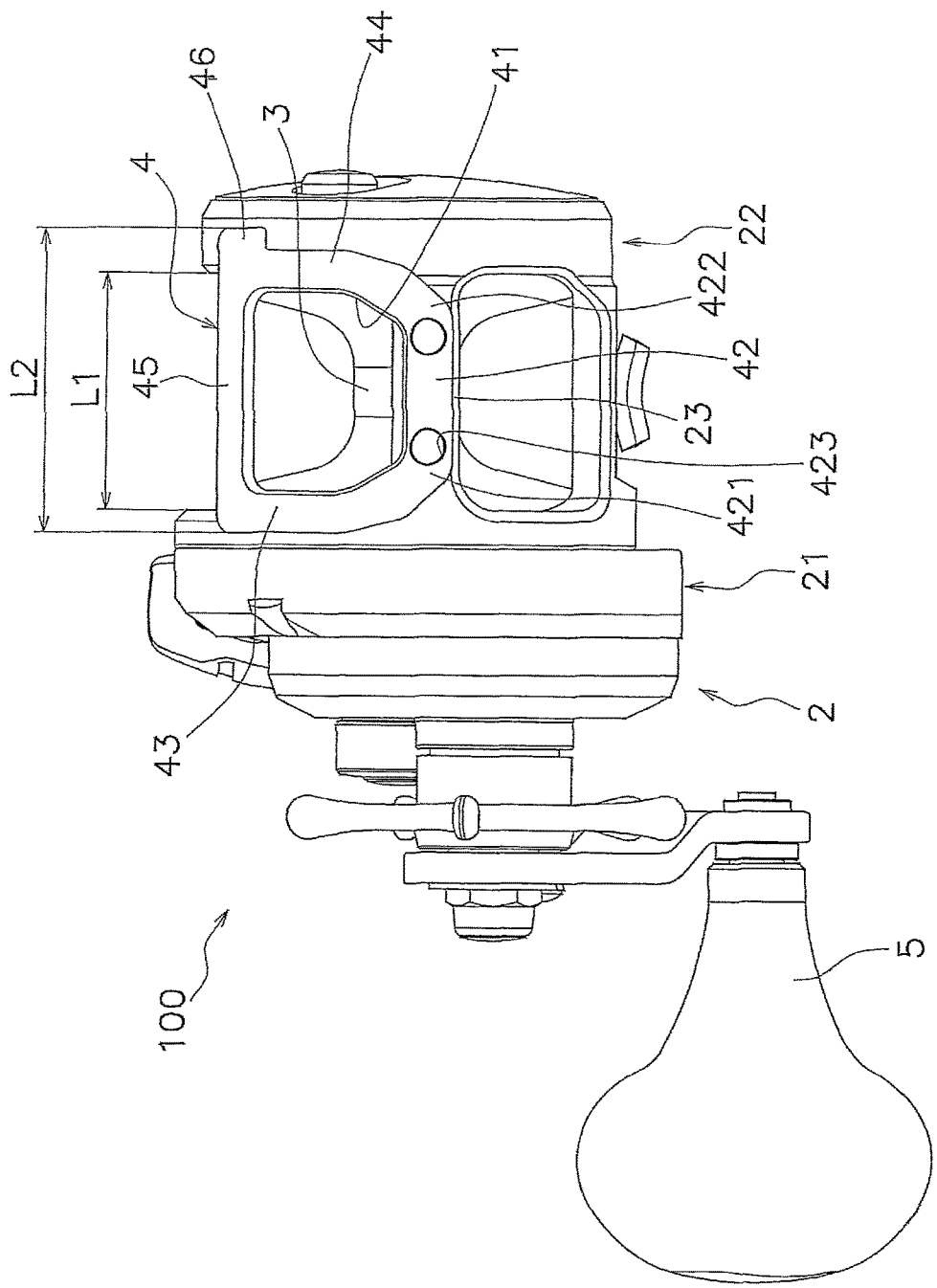
FIG. 3 is a front view of the dual-bearing reel.

FIG. 3 is an elevation view of the dual-bearing reel seen from a front view. As shown in FIG. 3, the guide member 4 is a member for restricting the moving range of the fishing line forwardly released from the spool 3. The guide member 4 is attached to the reel unit 2. Specifically, the guide member 4 is attached to a predetermined one of the coupling parts 23 of the reel unit 2. For example, the guide member 4 can be detachably attached to the predetermined coupling part 23 by rivets and so forth. Alternatively, the guide member 4 can be attached to the predetermined coupling part 23 by clips, adhesive, screws, or bolts. When the dual-bearing reel 100 is seen from a front view, the guide member 4 overlaps with the first and second reel bodies 21 and 22. In other words, a width L2 of the guide member 4 is greater than a distance L1 between the inner wall surface of the first reel body 21 and that of the second reel body 22 in the axial direction. Additionally, the guide member 4 contacts the first and second reel bodies 21 and 22.

The guide member 4 can be made of, for instance, an aluminum alloy, a stainless steel or titanium. When made of an aluminum alloy, the guide member 4 is preferably processed with an alumite treatment or a hard alumite treatment. When made of a stainless steel, the guide member 4 is preferably processed with a nickel plating or a nickel-chrome plating. When made of titanium, the guide member 4 is preferably processed with an ion plating.

Figure 4:
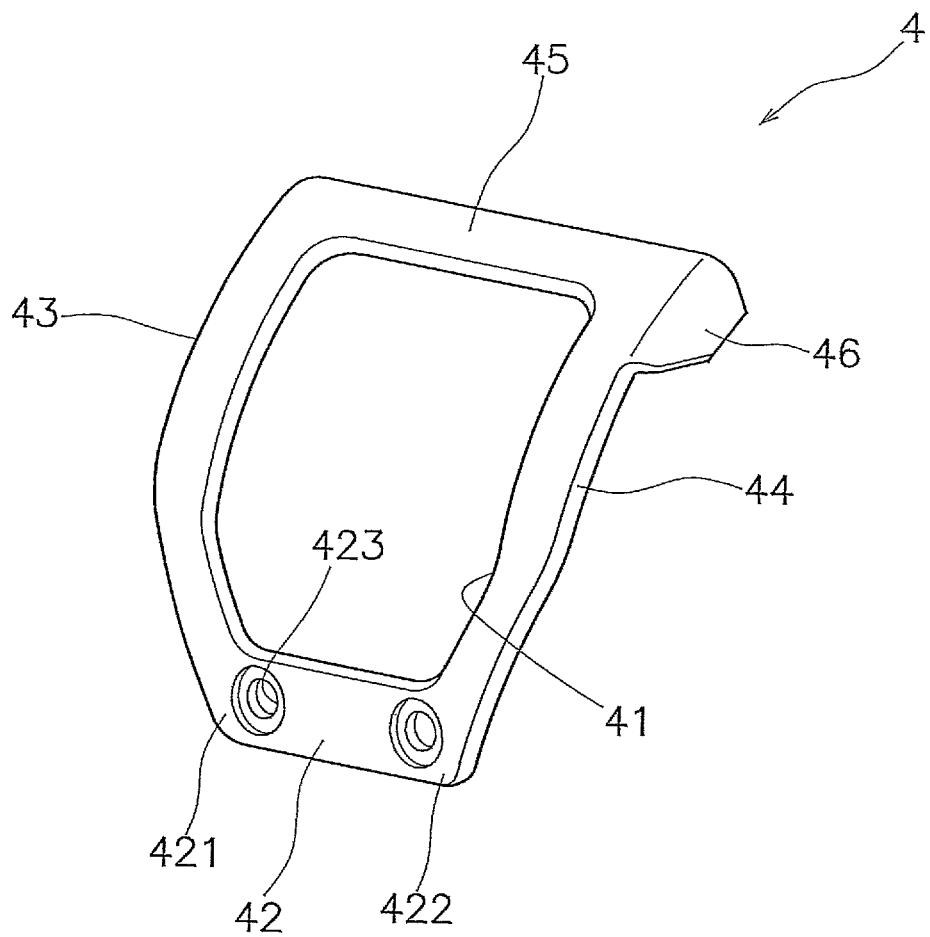
FIG. 4 is a perspective view of a guide member.

As shown in FIG. 4, the guide member 4 has an annular shape and is provided with a guide hole 41. The fishing line extends through the guide hole 41. The guide member 4 includes a mount part 42, a first guide part 43, a second guide part 44, a third guide part 45 and a contact part 46. The mount part 42, the first guide part 43, the second guide part 44, the third guide part 45 and the contact part 46 are provided as a single member. The guide member 4 is a member having a plate-like shape. For example, the guide member 4 can be produced by boring the middle part of a single plate-shaped member.

As shown in FIGS. 3 and 4, the mount part 42 attaches to the predetermined coupling part 23, and extends along the predetermined coupling part 23. Thus, the mount part 42 is an example of a mounting means. The mount part 42 includes a first end 421 and a second end 422. The first end 421 is located on the same side of the guide member 4 as the first reel body 21, whereas the second end 422 is disposed on the same side of the guide member 4 as the second reel body 22. The mount part 42 includes a plurality of attachment holes 423. Fastener members such as bolts or rivets are fastened to the predetermined coupling part 23 while passing through the attachment holes 423. Thus, an attachment hole 423 is an example of an attachment means. In an alternative embodiment, the attachment holes 423 are annular recesses (not illustrated). As a result, the guide member 4 is attached to the predetermined coupling part 23 of the reel unit 2. In other words, the guide member 4 is detachable from the reel unit 2.

The first guide part 43 extends from the first end 421 of the mount part 42 in the circumferential direction. When described in detail, the first guide part 43 extends along an outer peripheral surface of the first reel body 21. When described in more detail, the first guide part 43 extends along an outer peripheral surface of the first side plate 21*a* of the first reel body 21. The first guide part 43 contacts the outer peripheral surface of the first reel body 21. When described in detail, the first guide part 43 contacts the outer peripheral surface of the first side plate 21*a* of the first reel body 21.

The second guide part 44 extends from the second end 422 of the mount part 42 in the circumferential direction. When described in detail, the second guide part 44 extends along an outer peripheral surface of the second reel body 22. When described in more detail, the second guide part 44 extends along an outer peripheral surface of the second side plate 22*a* of the second reel body 22. The second guide part 44 is disposed at an interval away from the outer peripheral surface of the second reel body 22. This can be due to a construction in which the second reel body 22 has a smaller outer diameter than the first reel body 21. When described in detail, this can be due to a construction in which the second side plate 22*a* of the second reel body 22 has a smaller outer diameter than the first side plate 21*a* of the first reel body 21.

The second guide part 44 is disposed at an interval away from the first guide part 43 in the axial direction. When described in detail, the second guide part 44 can extend substantially parallel to the first guide part 43. The first and second guide parts 43 and 44 define an axial moving range of the fishing line. Thus, the first and second guide parts 43 and 44 are examples of guiding means.

The third guide part 45 extends between the first guide part 43 and the second guide part 44 in the axial direction. The third guide part 45 couples an end of the first guide part 43 and an end of the second guide part 44. The third guide part 45 is disposed at an interval away from the mount part 42. When described in detail, the third guide part 45 can extend substantially parallel to the mount part 42. The third guide part 45 and the mount part 42 define a circumferential moving range of the fishing line. Thus, the third guide part 45 is another example of guiding means.

The contact part 46 extends in a radial direction towards the rotational axis O from the second guide part 44. In other words, the contact part 46 extends from the second guide part 44 toward the second reel body 22. The contact part 46 contacts the outer peripheral surface of the second reel body 22. Thus, the contact part 46 is an example of a contacting means. For example, the contact part 46 can be formed by bending a part of the guide member 4, protruding outside from the second guide part 44 in an axial direction, toward the second reel body 22.

As shown in FIG. 2, the handle 5 is rotatably mounted to the first reel body 21. When described in detail, the handle 5 is mounted to a drive shaft 61 protruding from the first reel body 21. The rotation of the handle 5 is transmitted to the spool 3 through the rotation transmission mechanism 6.

The rotation transmission mechanism 6 is a mechanism that transmits the rotation of the handle 5 to the spool 3. The rotation transmission mechanism 6 is disposed in the internal space of the first reel body 21. When described in detail, the rotation transmission mechanism 6 includes the drive shaft 61, a drive gear 62 and a pinion gear 63.

The drive shaft 61 is coupled to the handle 5 and is unitarily rotated with the handle 5. It should be noted that the drive shaft 61 can be prevented from rotating in a fishing-line releasing direction by a one-way clutch 64.

The drive gear 62 is mounted to the drive shaft 61 and is unitarily rotated with the drive shaft 61. The pinion gear 63 is meshed with the drive gear 62. It should be noted that the pinion gear 63 has a tubular shape. The pinion gear 63 is coupled to the spool shaft 30 through a clutch mechanism 65. When the clutch mechanism 65 is engaged (clutch-on state), the pinion gear 63 and the spool shaft 30 are unitarily rotated. In contrast, when the clutch mechanism 65 is disengaged (clutch-off state), the pinion gear 63 and the spool shaft 30 are rotatable relative to each other. For example, the clutch mechanism 65 can be composed of an engaging pin and an engaging recess. The engaging pin penetrates the spool shaft 30 in a radial direction from the rotational axis O. The engaging recess is provided on the pinion gear 63. The clutch-on state and the clutch-off state of the clutch mechanism 65 can be switched in accordance with an axial movement of the pinion gear 63.

According to the aforementioned dual-bearing reel 100, when the dual-bearing reel 100 is seen from a front view, the guide member 4 overlaps with the first and second reel bodies 21 and 22. Additionally, the guide member 4 contacts the first and second reel bodies 21 and 22. With this construction, the fishing line can be prevented from getting stuck in a gap between the guide member 4 and the reel unit 2.

<Modifications>

Figure 5:
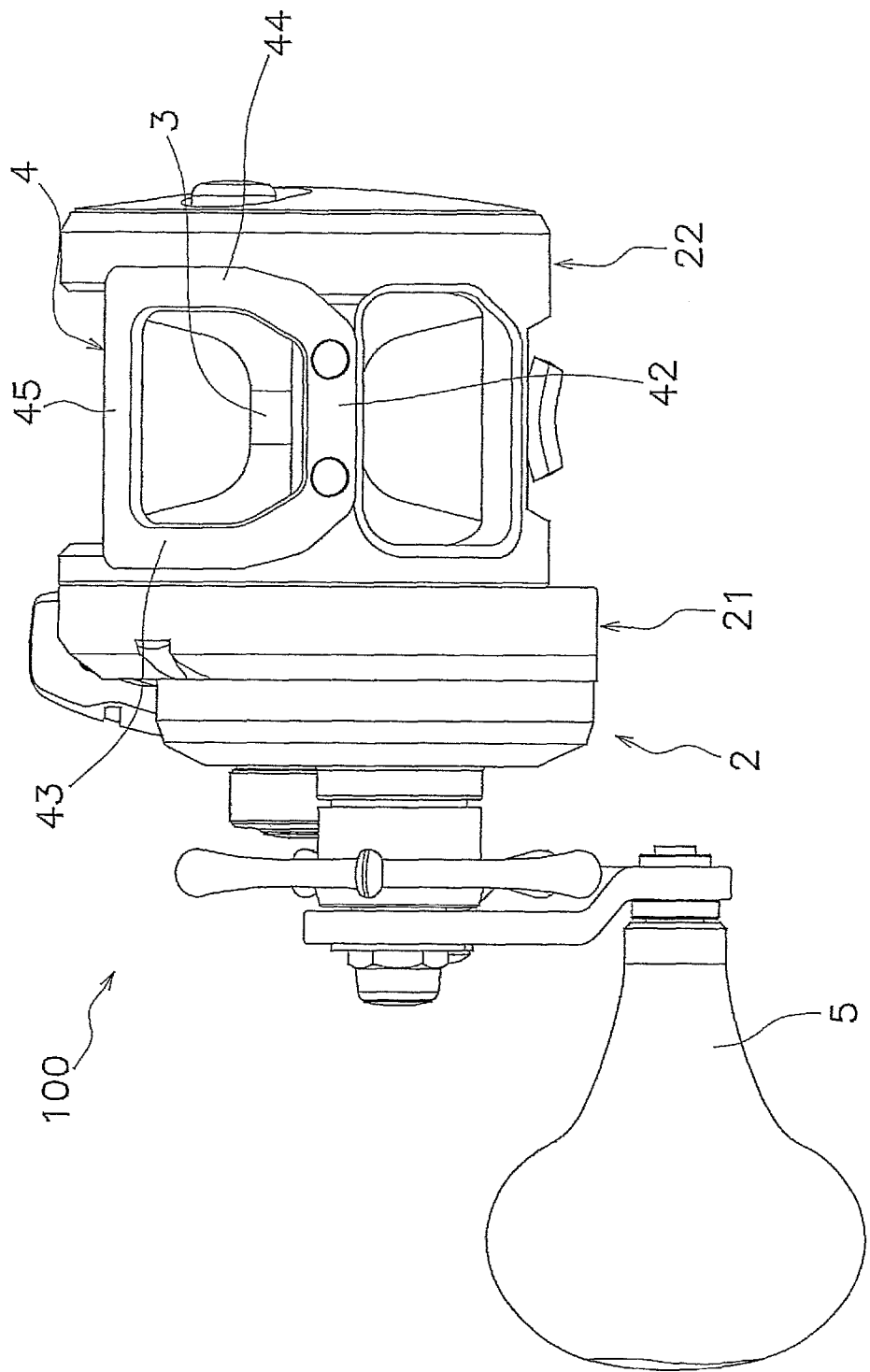
FIG. 5 is a front view of a dual-bearing reel according to a modification.

One preferred embodiment of the present disclosure has been explained above. However, the present disclosure is not limited to the above, and a variety of changes can be made without departing from the scope of the present disclosure. For example, as shown in FIG. 5, the guide member 4 does not include the contact part 46. In this construction, the second guide part 44 contacts the second reel body 22.

Figure 6:
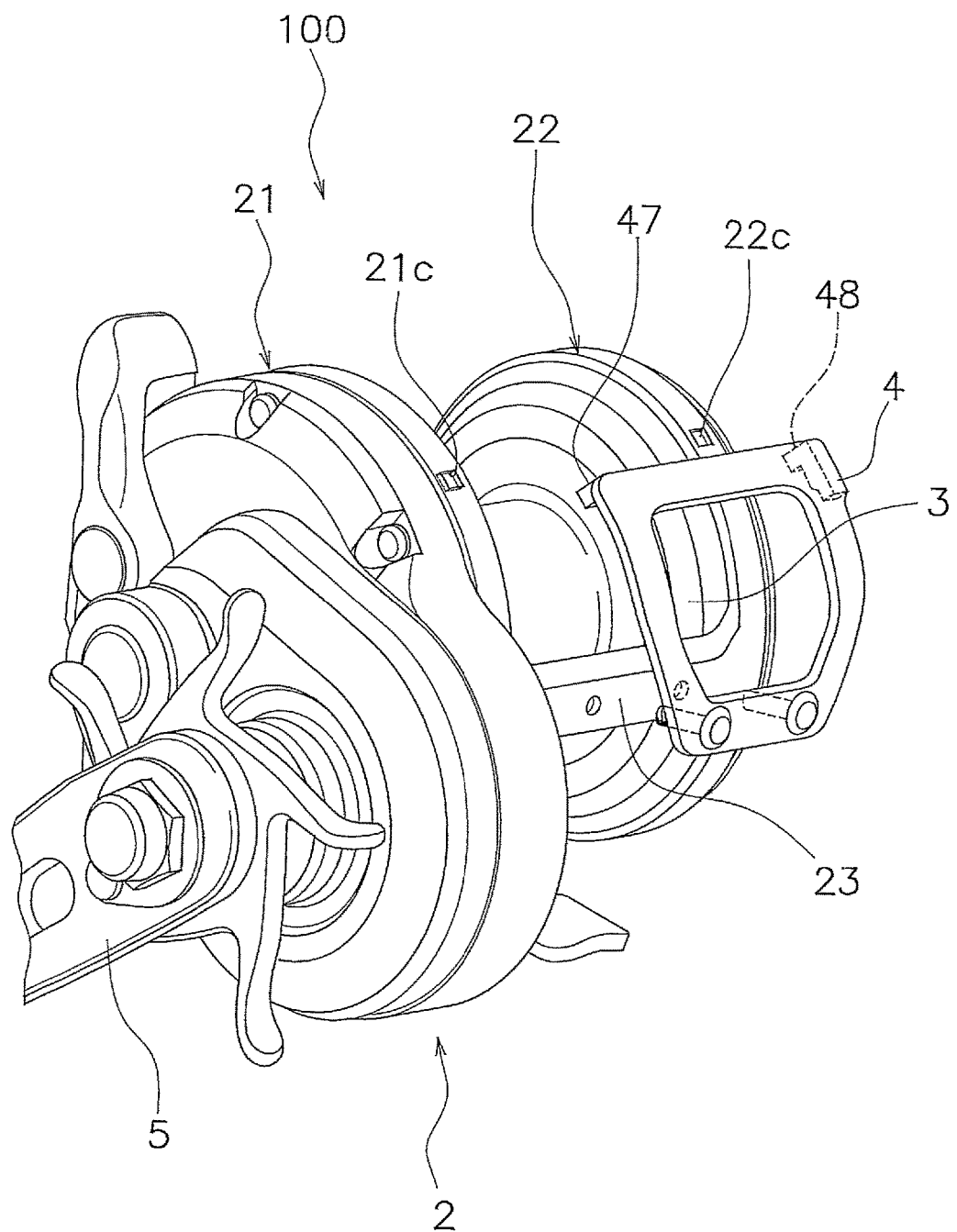
FIG. 6 is a perspective view of the dual-bearing reel according to the modification.

Alternatively, the guide member 4 can be fitted to the first and second reel bodies 21 and 22. When described in detail, as shown in FIG. 6, the first reel body 21 includes a first recess 21c on its outer peripheral surface. The guide member 4 includes a first protrusion 47 designed to be fitted to the first recess 21c. Thus, the first protrusion 47 is an example of a fitting means. The guide member 4 includes the first protrusion 47, and the first protrusion 47 is disposed on one circumferential end of the guide member 4. The mount part 42 is disposed on the other circumferential end of the guide member 4. In other words, the first protrusion 47 is disposed on the opposite side of the mount part 42 in the circumferential direction. In should be noted that the first protrusion 47 can be formed by bending a plate-like member.

The second reel body 22 includes a second recess 22c on its outer peripheral surface. The guide member 4 includes a second protrusion 48 designed to be fitted to the second recess 22c. Thus, the second protrusion 48 is another example of a fitting means. The guide member 4 includes the second protrusion 48, and the second protrusion 48 is disposed on the one circumferential end of the guide member 4. It should be noted that the second protrusion 48 is disposed on the opposite side of the mount part 42 in the circumferential direction. The mount part 42 is disposed on the other circumferential end of the guide member 4 in the circumferential direction. In other words, the second protrusion 48 is disposed on the opposite side of the mount part 42 in the circumferential direction. It should be noted that the second protrusion 48 can be formed by bending a plate-like member.

In a second alternative embodiment, the first recess 21c is instead disposed in the first guide part 43, and the second recess 22 is instead disposed in the second guide part 44. Thus, the first protrusion 47 instead protrudes from the first reel body 21 and is designed to be fitted to the first recess 21c, and the second protrusion 48 instead protrudes from the second reel body 22 and is designed to be fitted into the second recess 22c.

What is claimed is:

1. A dual-bearing reel, comprising:
    a reel unit including a first reel body and a second reel body;
    a spool between the first reel body and the second reel body; and
    a guide member attached to the reel unit, wherein the guide member includes
        a mount part extending in a direction parallel to a rotational axis of the spool, the mount part attached to the reel unit,
        a first guide part extending from a first end of the mount part,
        a second guide part extending from a second end of the mount part, and
        a third guide part extending parallel to the direction, the third guide part coupling the first guide part and the second guide part,
    the guide member to restrict a moving range of a finishing line forwardly released from the spool, the guide member overlapping with the first reel body and the second reel body, the guide member contacting the first reel body and the second reel body.

2. The dual-bearing reel according to claim 1, wherein the guide member has a plate-like shape.

3. The dual-bearing reel according to claim 1, wherein the first guide part contacts the first reel body.

4. The dual-bearing reel according to claim 1, wherein
    the guide member includes a contact part extending from the second guide part toward the second reel body, and
    the contact part contacts the second reel body.

5. The dual-bearing reel according to claim 1, wherein the second guide part contacts the second reel body.

6. The dual-bearing reel according to claim 1, wherein
    the first reel body includes a first recess on an outer peripheral surface, and
    the guide member includes a first protrusion, the first protrusion to be fitted to the first recess.

7. The dual-bearing reel according to claim 6, wherein the guide member includes the first protrusion on a first circumferential end, and
    the guide member is attached to the reel unit at a second circumferential end.

8. The dual-bearing reel according to claim 6, wherein
    the second reel body includes a second recess on an outer peripheral surface, and the guide member includes a second protrusion, the second protrusion to be fitted to the second recess.

9. The dual-bearing reel according to claim 8, wherein the guide member includes the second protrusion on a first circumferential end, and the guide member is attached to the reel unit at a second circumferential end.

10. A dual-bearing reel, comprising:

a reel unit including a first reel body and a second reel body;

a spool between the first reel body and the second reel body; and a guiding member including mounting means for mounting the guiding member, the mounting means extending in a direction parallel to a rotational axis of the spool, the mounting means attached to the reel unit, first guiding means for guiding a fishing line, the first guiding means extending from a first end of the mounting means, second guiding means for guiding the fishing line, the second guiding means extending from a second end of the mounting means, and third guiding means for guiding the fishing line, the third guiding means extending parallel to the direction, the third guiding means coupling the first guiding means and the second guiding means.

11. The dual-bearing reel according to claim 10, wherein the mounting means includes attachment means for accepting a fastener.

12. The dual-bearing reel according to claim 10, wherein the guiding member further includes contacting means for contacting a reel body.

13. The dual-bearing reel according to claim 10, wherein the guiding member further includes first fitting means for fitting a first recess.

14. The dual-bearing reel according to claim 13, wherein the guiding member further includes second fitting means for fitting a second recess.

* * * * *